No. 791,635. PATENTED JUNE 6, 1905.
T. MANN & C. GOEBEL.
ELECTRODE FOR PRIMARY BATTERIES.
APPLICATION FILED JAN. 21, 1903.

3 SHEETS—SHEET 1.

Witnesses:
Arthur Juengr.
Edward Ray.

Inventors:
Theodor Mann &
Carl Goebel
by their attorney

No. 791,635. PATENTED JUNE 6, 1905.
T. MANN & C. GOEBEL.
ELECTRODE FOR PRIMARY BATTERIES.
APPLICATION FILED JAN. 21, 1903.

3 SHEETS—SHEET 2.

Witnesses:

Inventors:
Theodor Mann &
Carl Goebel
by their attorney

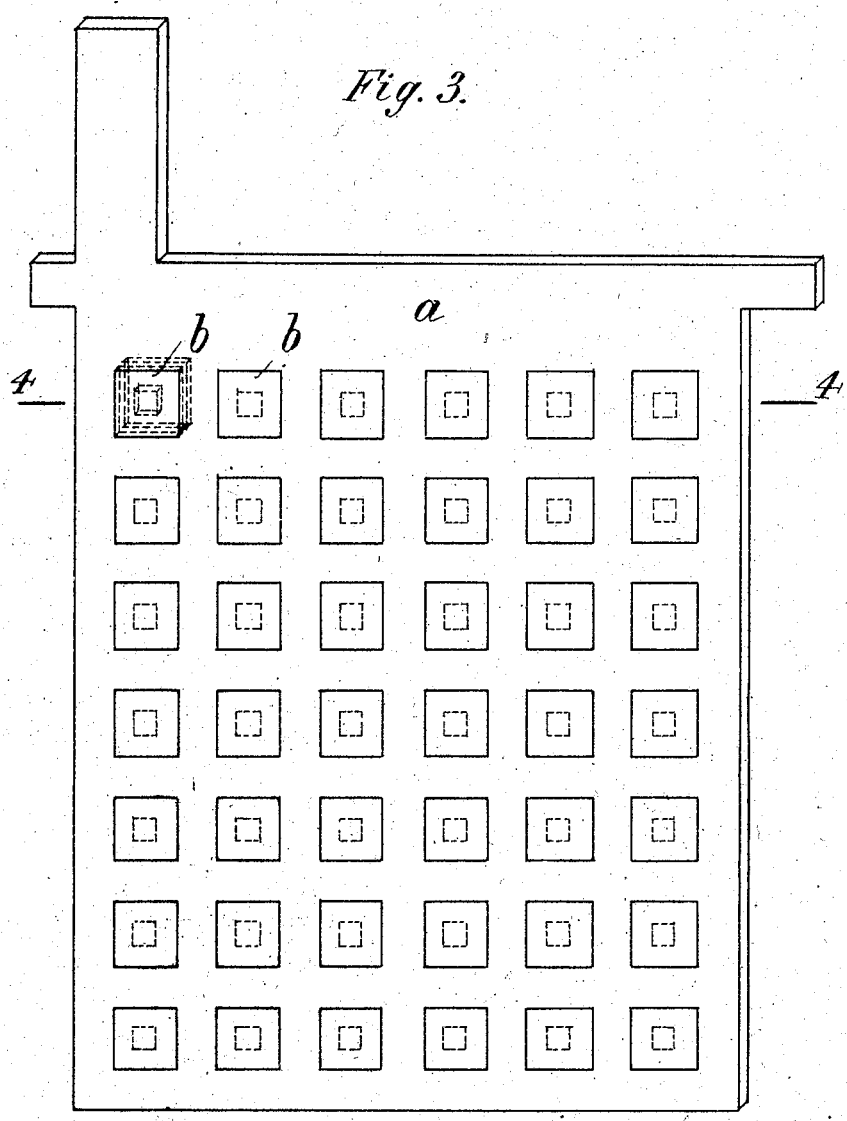
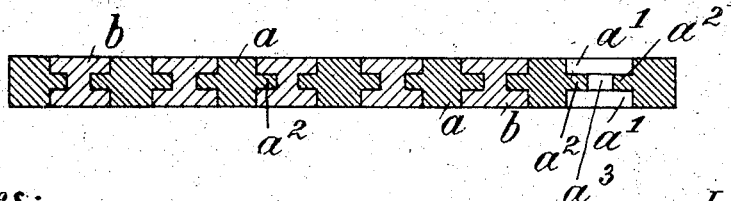

No. 791,635.

Patented June 6, 1905.

UNITED STATES PATENT OFFICE.

THEODOR MANN AND CARL GOEBEL, OF DUISBURG, GERMANY.

ELECTRODE FOR PRIMARY BATTERIES.

SPECIFICATION forming part of Letters Patent No. 791,635, dated June 6, 1905.

Application filed January 21, 1903. Serial No. 139,895.

*To all whom it may concern:*

Be it known that we, THEODOR MANN and CARL GOEBEL, subjects of the King of Prussia, German Emperor, residing at Duisburg, in the Kingdom of Prussia, German Empire, have invented new and useful Improvements in Electrodes for Primary Batteries, of which the following is a specification.

The present invention relates to an improved construction of the carbon and zinc electrodes for powerful electric primary batteries. The carbon electrode has a working surface which is greater than the surface of a plane having the same lineal dimensions as such electrode, while the zinc electrode has a working surface which is less than the surface of a plane having the same lineal dimensions as such electrode.

The construction consists, substantially, in providing the carbon electrode with recesses or ribs or similar protuberances, which are adapted to increase the effective surface of the carbon. Preferably the carbon electrode can be made in the form of a box in order to obtain a capacity as great as possible. Owing to this construction of the carbon electrode and the increase of its active surface, a powerful battery is obtained which permits a current of great strength and of a nearly constant potential to be generated.

The zinc electrode is made integral or of a single thickness, and while the outer dimensions of its working surface are equal to those of the carbon electrode the construction is such that it offers a diminished surface for action. The purpose is attained by placing opposite to the box-shaped carbon electrode a zinc electrode, the surface or lineal face dimension of which corresponds exactly to that of the front wall of the carbon electrode, its surface for action, however, being diminished by the insertion of suitable acid-proof insulating material into the zinc body.

Figure 1:
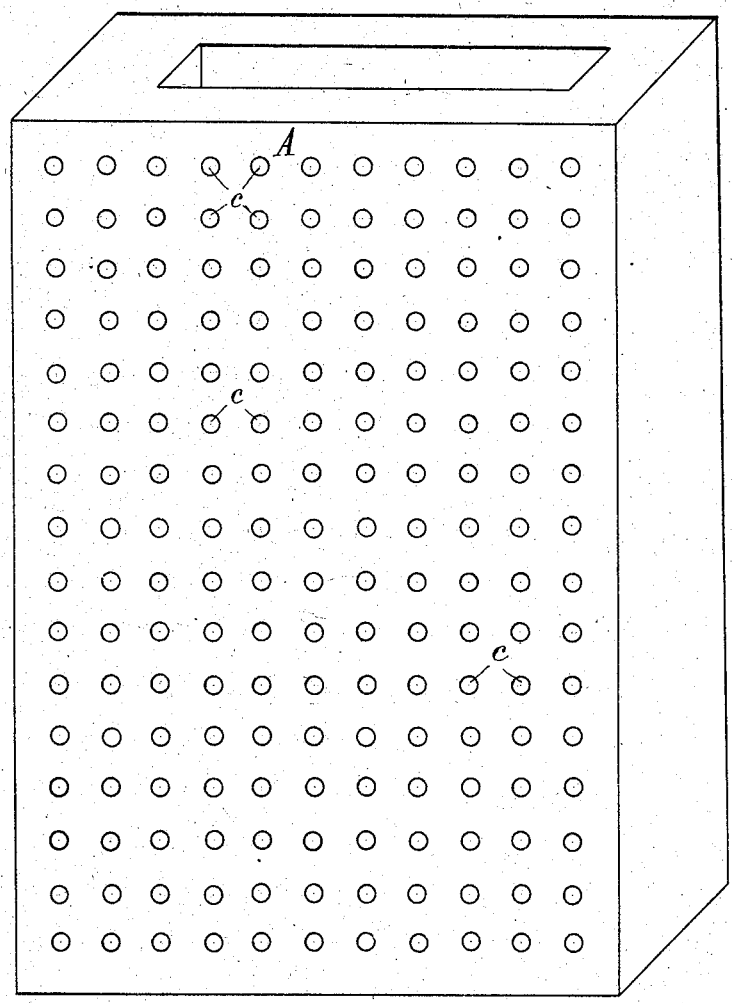
Figure 2:
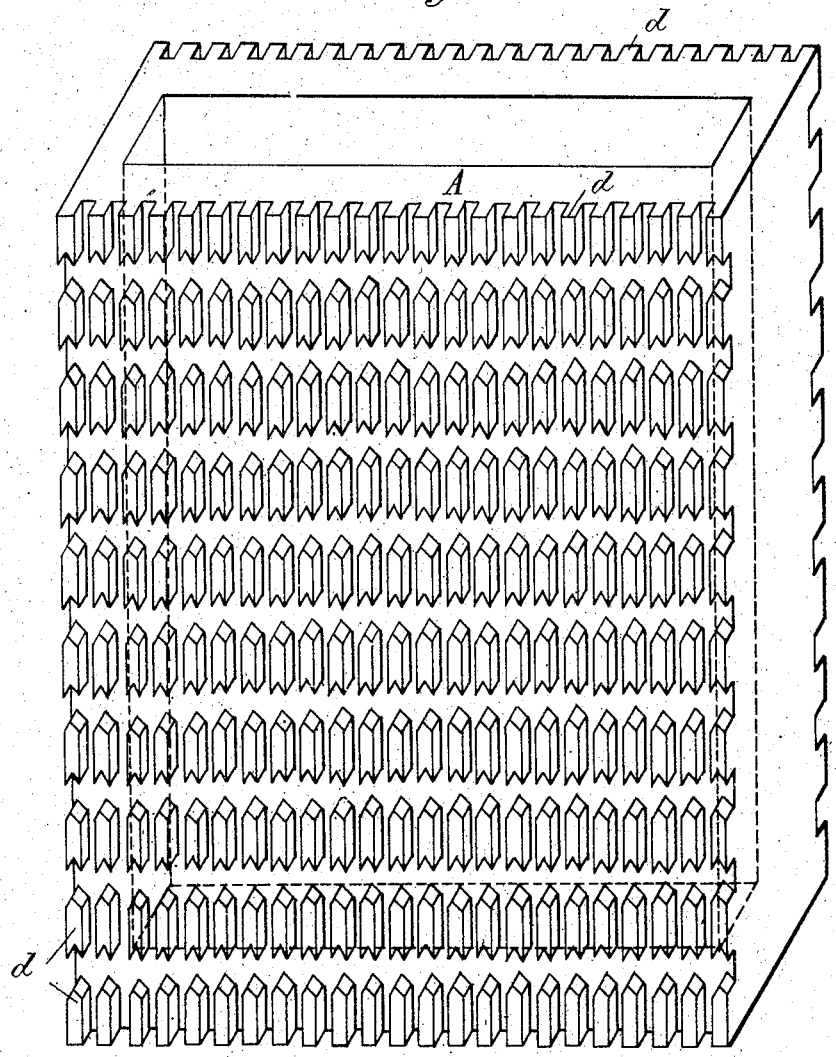

In the accompanying drawings, Figure 1 is a perspective view of the carbon electrode; Fig. 2, a similar view of a modification thereof; Fig. 3, a perspective view of the zinc electrode; and Fig. 4, a cross-section on line 4 4, Fig. 3, with the insulating material partly removed.

The box-shaped or hollow carbon electrode A, according to Figs. 1 and 2, is filled with suitable acid, such as nitric acid, in order to depolarize the working surface of the carbon electrode by diffusing through the pores of said electrode. In Fig. 1 the surface is increased by recesses $c$, provided in the longitudinal walls, but not passing through them, and in Fig. 2 by longitudinal ribs $d$, which are interrupted at suitable intervals by recesses. The elevations or indentations used as means for increasing the surface can, however, also be of any other form desired. The electric connection may be made by copper or any other conductor, which is either covered with an acid-resisting metal or the surface of which may be converted into an acid-resisting combination. Carbon plugs or wedges may also be used for connections.

With the zinc electrode, according to Fig. 3, both sides of the zinc body or plate $a$ are provided with a number of square recesses $a'$, the recesses on one side being in alinement with those on the opposite side. In this way a partition or web $a^2$ is formed between each pair of recesses, which is provided with a central square opening $a^3$. Into the perforations thus formed a soft insulating material $b$ is pressed until the surface of the latter is flush with the surface of the plate. The insulating material is composed, preferably, of a mixture of wax with colophony or of paraffin or of an acid-proof varnish. If desired, a rigid insulator may be used, which is fitted into the recesses $a'$. The size and number of the insulators depend upon the size of the working surface of the carbon electrode. The spaces and insulating-pieces can also be shaped or arranged in any other way that enables the same object to be attained—*i. e.*, reduction of the working surface while retaining the outer face dimensions of the electrode. For example, the zinc electrode can also be composed of pieces of zinc and insulation-pieces.

What we claim as our invention is—

1. An electric primary battery composed of a carbon electrode having a working surface which is greater than the surface of a plane having the same lineal dimensions as the electrode, and a zinc electrode of like size having a working surface which is less than the surface of a plane having the same lineal dimensions as the electrode, substantially as specified.

2. An electric primary battery composed of a hollow carbon electrode having a working surface which is greater than the surface of a plane having the same lineal dimensions as the electrode, and a zinc electrode having acid-proof insulators that reduce its working surface, substantially as specified.

3. In an electric battery, an integral zinc electrode having a series of recesses that reduce its working surface, and acid-resisting insulators within said recesses, substantially as specified.

In witness whereof we have hereunto signed our names in the presence of two subscribing witnesses.

THEODOR MANN.
CARL GOEBEL.

Witnesses:
WILLIAM ESSENWEIN,
ERNEST ANDRÉ.